US008920770B2

(12) United States Patent
Goodman et al.

(10) Patent No.: US 8,920,770 B2
(45) Date of Patent: Dec. 30, 2014

(54) SYSTEM AND METHOD FOR ON-BOARD WASTE HEAT RECOVERY

(71) Applicant: Cummins Inc., Columbus, IN (US)

(72) Inventors: Wayne Goodman, College Station, TX (US); Aleksey Yezerets, Columbus, IN (US); Neal W. Currier, Columbus, IN (US); Cheryl Klepser, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 13/860,979

(22) Filed: Apr. 11, 2013

(65) Prior Publication Data

US 2013/0219870 A1    Aug. 29, 2013

Related U.S. Application Data

(62) Division of application No. 12/378,592, filed on Feb. 17, 2009, now Pat. No. 8,431,043.

(60) Provisional application No. 61/029,137, filed on Feb. 15, 2008.

(51) Int. Cl.
| | | |
|---|---|---|
| C01B 3/24 | (2006.01) | |
| C01B 3/26 | (2006.01) | |
| F01N 5/02 | (2006.01) | |
| F02G 5/02 | (2006.01) | |
| C01B 3/50 | (2006.01) | |
| F02B 43/00 | (2006.01) | |
| F01N 3/10 | (2006.01) | |

(52) U.S. Cl.
CPC ... *F01N 3/10* (2013.01); *C01B 3/26* (2013.01); *F01N 5/02* (2013.01); *C01B 2203/066* (2013.01); *Y02T 10/32* (2013.01); *F02G 5/02* (2013.01); *C01B 3/506* (2013.01); *F02B 43/00* (2013.01); *C01B 2203/048* (2013.01); *Y02T 10/166* (2013.01); *Y02T 10/16* (2013.01)
USPC ............................................. 423/650; 60/286

(58) Field of Classification Search
None
See application file for complete search history.

(56) References Cited

U.S. PATENT DOCUMENTS

| 4,002,151 A | 1/1977 | Toyoda et al. |
| 4,221,678 A | 9/1980 | Ishikawa et al. |

(Continued)

FOREIGN PATENT DOCUMENTS

| GB | 2159876 A | 12/1985 |
| GB | 2159976 A  *  12/1985 |

(Continued)

OTHER PUBLICATIONS

Machine Translation of JP2004-017701, Jan. 2004.

(Continued)

*Primary Examiner* — Melvin C Mayes
*Assistant Examiner* — Kenneth Vaden
(74) *Attorney, Agent, or Firm* — Krieg DeVault LLP

(57) ABSTRACT

A technique is described including receiving a hydrocarbon stream, and heating the hydrocarbon stream with an exhaust steam from an internal combustion engine. This technique may include reacting the hydrocarbon stream catalytically to produce hydrogen and a modified hydrocarbon stream having a lower saturation state than the hydrocarbon stream, recovering energy from the hydrogen stream, and/or providing the modified hydrocarbon stream to a fuel supply for the internal combustion engine.

18 Claims, 5 Drawing Sheets

(56) References Cited

U.S. PATENT DOCUMENTS

| | | | |
|---|---|---|---|
| 5,132,007 A | 7/1992 | Meyer et al. | |
| 5,611,912 A | 3/1997 | Han et al. | |
| 6,609,582 B1 | 8/2003 | Botti et al. | |
| 6,663,767 B1 | 12/2003 | Berlowitz et al. | |
| 6,739,295 B1 | 5/2004 | Yamaoka et al. | |
| 6,769,244 B2 | 8/2004 | Headley et al. | |
| 6,966,295 B2 | 11/2005 | Yamaoka et al. | |
| 7,150,866 B2 | 12/2006 | Wieland et al. | |
| 7,235,322 B2 * | 6/2007 | Akikusa et al. | 429/425 |
| 2003/0168024 A1 * | 9/2003 | Qian et al. | 123/3 |
| 2004/0101722 A1 | 5/2004 | Faye et al. | |
| 2006/0182680 A1 | 8/2006 | Keefer et al. | |
| 2007/0028905 A1 * | 2/2007 | Shinagawa et al. | 123/575 |

FOREIGN PATENT DOCUMENTS

| | | | |
|---|---|---|---|
| JP | 2004017701 A | 1/2004 |
| JP | 2004512456 T2 | 4/2004 |
| KR | 1020030085526 A | 11/2003 |
| KR | 1020060066747 A | 6/2006 |
| KR | 1020070017302 A | 2/2007 |
| RU | 2046979 C1 | 10/1995 |

OTHER PUBLICATIONS

English Abstract of KR 1020030085526, Nov. 19, 2009.
English Abstract of KR 1020060066747, Nov. 19, 2009.
English Abstract of KR 1020070017302, Nov. 19, 2009.
English Abstract of JP 2004512456, Nov. 6, 2009.
International Search Report and Written Opinion, ISA/KR, PCT/US2009/000990, Cummins Inc., Oct. 5, 2009.
Restriction Requirement, U.S. Appl. No. 12/378,592, Goodman et al., Mar. 10, 2011.
Non Final Office Action, U.S. Appl. No. 12/378,592, Goodman et al., Oct. 11, 2011.
Non Final Office Action, U.S. Appl. No. 12/378,592, Goodman et al., Jun. 6, 2012.

* cited by examiner

SYSTEM AND METHOD FOR ON-BOARD WASTE HEAT RECOVERY

CROSS-REFERENCE TO RELATED APPLICATIONS

The present application is a Divisional of U.S. patent application Ser. No. 12/378,592 titled "SYSTEM AND METHOD FOR ON-BOARD WASTE HEAT RECOVERY", filed on Feb. 17, 2009, now U.S. Pat. No. 8,431,043, which claims the benefit of U.S. Provisional Patent Application No. 61/029,137 titled "SYSTEM AND METHOD FOR ON-BOARD WASTE HEAT RECOVERY", filed Feb. 15, 2008, each of which are hereby incorporated by reference in their entirety for all purposes.

BACKGROUND

The present application relates to waste heat recovery, and more particularly, but not exclusively, relates to converting fuel from a lower energy chemical state to a higher energy chemical state utilizing an available waste heat stream on-board a mobile application.

Internal combustion engines typically emit large quantities of low temperature heat energy that can be difficult to utilize efficiently. Furthermore, improved fuel formulation is often desired in connection with emissions regulations, fuel economy, or the like. In order to address these and/or other concerns, there continues to be a need for further technical contributions.

SUMMARY

One embodiment of the present application is a unique technique to utilize exhaust stream energy. Other embodiments include unique devices, apparatus, systems, and methods to recover energy from exhaust and/or utilize it to reformulate a hydrocarbon stream into two or more other products. Further embodiments, forms, objects, features, advantages, aspects, and benefits shall become apparent from the following description and drawings.

DETAILED DESCRIPTION OF REPRESENTATIVE EMBODIMENTS

Figure 1:
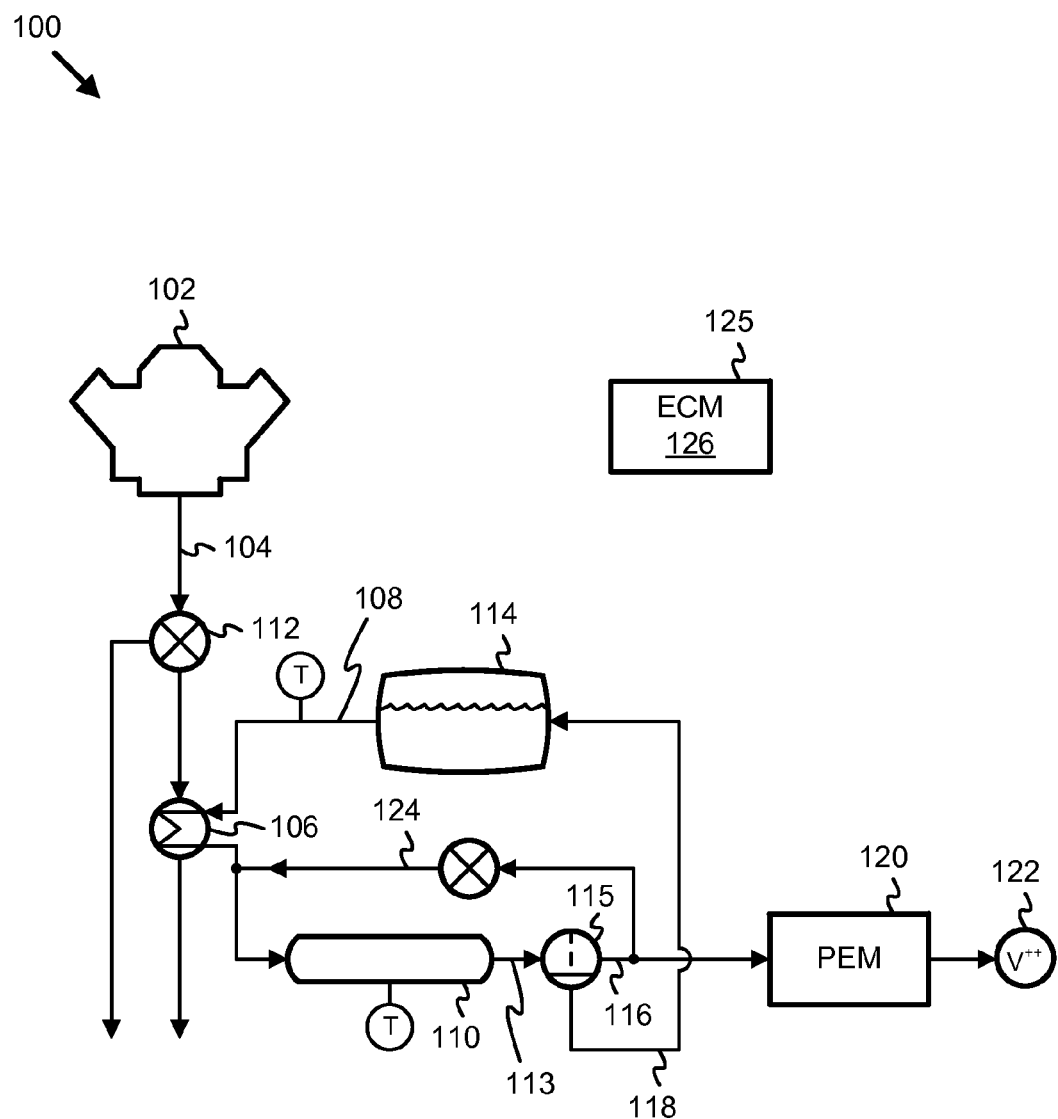
FIG. 1 is a schematic diagram of a system for on-board waste heat recovery.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 is a schematic diagram of a system 100 for on-board waste heat recovery. The system 100 includes an internal combustion engine 102 producing an exhaust stream 104. The engine 102 may be a reciprocating, rotary, turbine or any other type of engine 102 utilizing diesel, gasoline, and/or any hydrocarbon fuel as part or all of the energy source for the engine 102. In one embodiment, the engine 102 is a turbocharged diesel engine utilizing exhaust gas recirculation. The exhaust stream 104 carries residual heat from the combustion reaction in the engine 102. It is understood that the exhaust stream 104 will be hotter at some times than other times, and may carry negligible heat during events such as when the engine 102 is motoring and not executing a combustion cycle.

The system 100 further includes a heat exchanger 106 configured to transfer heat from the exhaust stream 104 to a hydrocarbon stream 108. The heat exchanger 106 may be a separate device from the catalyst element 110, or the heat exchanger 106 and the catalyst element 110 may be the same device. In a further embodiment, the heat exchanger 106 may be configured to allow heat exchange with the exhaust stream 104 during some periods of operation and to block heat exchange with the exhaust stream 104 during other periods of operation. In one embodiment, the system 100 may include a valve 112 that controls a fraction of the exhaust stream 104 flowing to the heat exchanger 106, allowing a controllable fraction of heat from the exhaust stream 104 to exchange with the hydrocarbon stream 108 and/or catalyst element 110.

The catalyst element 110 receives the hydrocarbon stream 108 from a fuel source 114. The hydrocarbon stream 108 may be the fuel that is provided to operate the engine 102. In one embodiment, the hydrocarbon stream 108 is vaporized. The hydrocarbon stream 108 may be vaporized, because the fuel source 114 holds gaseous fuel due to: heat from the exhaust stream 104 in the heat exchanger, heat from an alternate heat source (not shown), and/or heat exchange from the catalyst element 110. In one embodiment, the heat exchanger 106 is sized such that heat is provided to vaporize the hydrocarbon stream 108 and to heat the hydrocarbon stream 108 and catalyst element 110 to a specified or designed temperature.

The catalyst element 110 reacts the hydrocarbon stream 108, removing at least a fraction of hydrogen molecules from the hydrocarbon stream 108, and creating a products stream 113 which a separator 115 may separate into a hydrogen stream 116 and a modified hydrocarbon stream 118. The modified hydrocarbon stream 118 comprises a hydrocarbon stream having a lower saturation state than the hydrocarbon stream 108. The lower saturation state may be due to cracking of some hydrocarbon molecules (i.e. splitting of molecules to create one or more hydrocarbons with a lower number of carbon atoms) or due to enhancement of some hydrocarbon molecules (e.g. creation of double bonds, aromatics, and/or cyclic hydrocarbons). The saturation state of a molecule is a relative concept, where a less saturated molecule is more ready to accept further hydrogens than a more saturated molecule. A saturated molecule has a single bond at each carbon-carbon bond, and an unsaturated molecule has at least one double bond, triple bond, or aromatic ring. The catalyst formulation should be such that a significant fraction of the available hydrogen from the hydrocarbon stream 108 can be removed at temperatures that may be intermittently available within the heat exchanger 106. The reaction within the catalyst element 110 that decreases the saturation state of the hydrocarbon stream 108 is endothermic.

The fraction of hydrogen removed that defines a significant fraction varies with the application. For example, some applications may be focused on utilizing the endothermic reaction to remove heat from a stream, and in such applications a "significant fraction" may be a low number such as 1-5%, although higher numbers would be significant fractions as well. In an application focused on utilizing the evolved hydrogen—for example in power generation or as an additive to the engine 102 inlet—a fraction ranging from 3-10% or higher may be a significant fraction. In yet another application that may be focused on the modified hydrocarbon stream, a significant fraction may be the amount of hydrogen removal that produces the desired properties in the modified hydrocarbon stream.

The temperatures that may be intermittently available also vary with the application. For example, a diesel engine 102 has an exhaust stream 104 that will frequently exceed 300 degrees C., and can exceed 500 degrees C. in some applications or at loaded conditions. The available temperatures for a given application are values that are ordinarily understood by those of skill in the art designing such systems. The available temperatures may not be based on the exhaust stream 104, but may be based on any temperature in the system 100 that can be utilized for the heat exchanger 106, for example an exhaust gas recirculation (EGR) cooler temperature, an exhaust manifold temperature, or a turbocharger inlet temperature.

A number of catalyst formulations are useful for providing reasonable hydrogen removal fractions at temperatures ordinarily available in engine systems. A few examples of catalyst formulations are provided, and a few examples of catalyst formulation performance based on best estimates are provided. However, the examples are provided without limitation, and other catalyst formulations known in the art are also acceptable. Some catalyst formulations that perform acceptably in some systems 100 include: γ-alumina supported Pt, zeolite supported Pt, Pt—Sn/γ-alumina-$ZrO_2/SO_4^{2-}$ hybrid, Pt-zeolite/γ-alumina-$ZrO_2/SO_4^{2-}$ hybrid, Pt—ZrO2/WO3, Pt/HPA/$SiO_2$, and Ni/$SiO_2$—$Al_2O_3$. (HPA=heteropolyacid) One catalyst performance example includes a 0.8% Pt-γ-alumina catalyst with a space velocity of $280^{-1}$ (by mass) using vaporized diesel feed provides expected conversions of 1% $H_2$ at 250° C., 4% $H_2$ at 325° C., and 10% $H_2$ at 450° C., where % conversion comprises a percentage of the total hydrogen in the feed that is converted to $H_2$. Another catalyst performance example includes a similar configuration with a Pt—Sn/γ-alumina-$ZrO_2/SO_4^{2-}$ hybrid catalyst which provides expected conversions of 3% $H_2$ at 325° C. There is evidence with the Pt—Sn/γ-alumina-$ZrO_2/SO_4^{2-}$ hybrid catalyst that calcining the catalyst in air may improve the conversion—for example a change in calcination period from 2 hours at 550° C. to 12 hours at 550° C. improves expected conversion from about 3% $H_2$ to about 4% $H_2$.

The separator 115 provides the hydrogen stream 116 and a modified hydrocarbons stream 118 using standard separation techniques. The products stream 113 may be cooled such that the modified hydrocarbons stream 118 is a liquid, although passive cooling will normally be sufficient for this purpose. The modified hydrocarbons stream 118 may be returned to the fuel supply 114. The modified hydrocarbons stream 118 has a higher heating value than the hydrocarbons stream 108 due to the lower saturation value, so that in one embodiment some of the energy recovered from the exhaust stream 104 (or other heat source in the system 100) is returned to the fuel supply 114 to be recovered in the engine 102 during combustion. The hydrogen stream 116 may be supplied to a fuel cell 120 or similar device for recovering energy from the hydrogen stream 116. The recovered energy may be provided as power 122 available to the system 100, for example to power an auxiliary device. Energy recovery from the hydrogen stream 116 may be in any form understood in the art, including a burner that generates heat, pressure, and/or steam. Further, the hydrogen stream 116 may be utilized for other purposes. For example, the hydrogen stream 116 may be recycled to the catalyst element 110 inlet. In one example, the hydrogen stream 116 may be provided to the engine 102 inlet, where the addition of hydrogen in an internal combustion engine reduces the level of some emissions from the engine 102. In a further embodiment, the hydrogen stream 116 may be stored (not shown) and utilized at a rate independent of the generation rate of the hydrogen stream 116.

Alternatively or additionally, the system 100 may include a hydrogen recycle stream 124 that feeds back from the hydrogen stream 116 to the catalyst element inlet. The inclusion of hydrogen at the catalyst inlet can improve the hydrogen removal of the catalyst element 110. Further, the catalyst element 110 declines in activity during operation if elemental carbon builds-up on the catalyst surfaces. This overall degradation of catalyst activity is slowed in the presence of hydrogen. In one non-limiting example, it has been observed—on a γ-alumina supported Pt catalyst operating at 330° C.—that catalyst activity degraded about 75% over a 2 hour operating period without hydrogen addition, and that catalyst activity degraded only slightly (less than 10%) in the presence of hydrogen added at 4 moles $H_2$ per mole diesel fuel (about 5% $H_2$ by weight at the catalyst inlet). The amount of hydrogen added at the inlet relative to the hydrocarbons is dependent upon the composition of the hydrocarbons, the catalyst composition, and the operating temperature. Generally speaking, heavier hydrocarbons and lower temperatures indicate more hydrogen at the catalyst inlet to reduce catalyst activity degradation. Effective values of hydrogen addition at the catalyst inlet are easily determined for a given configuration by making a few straightforward observations.

Figure 3:
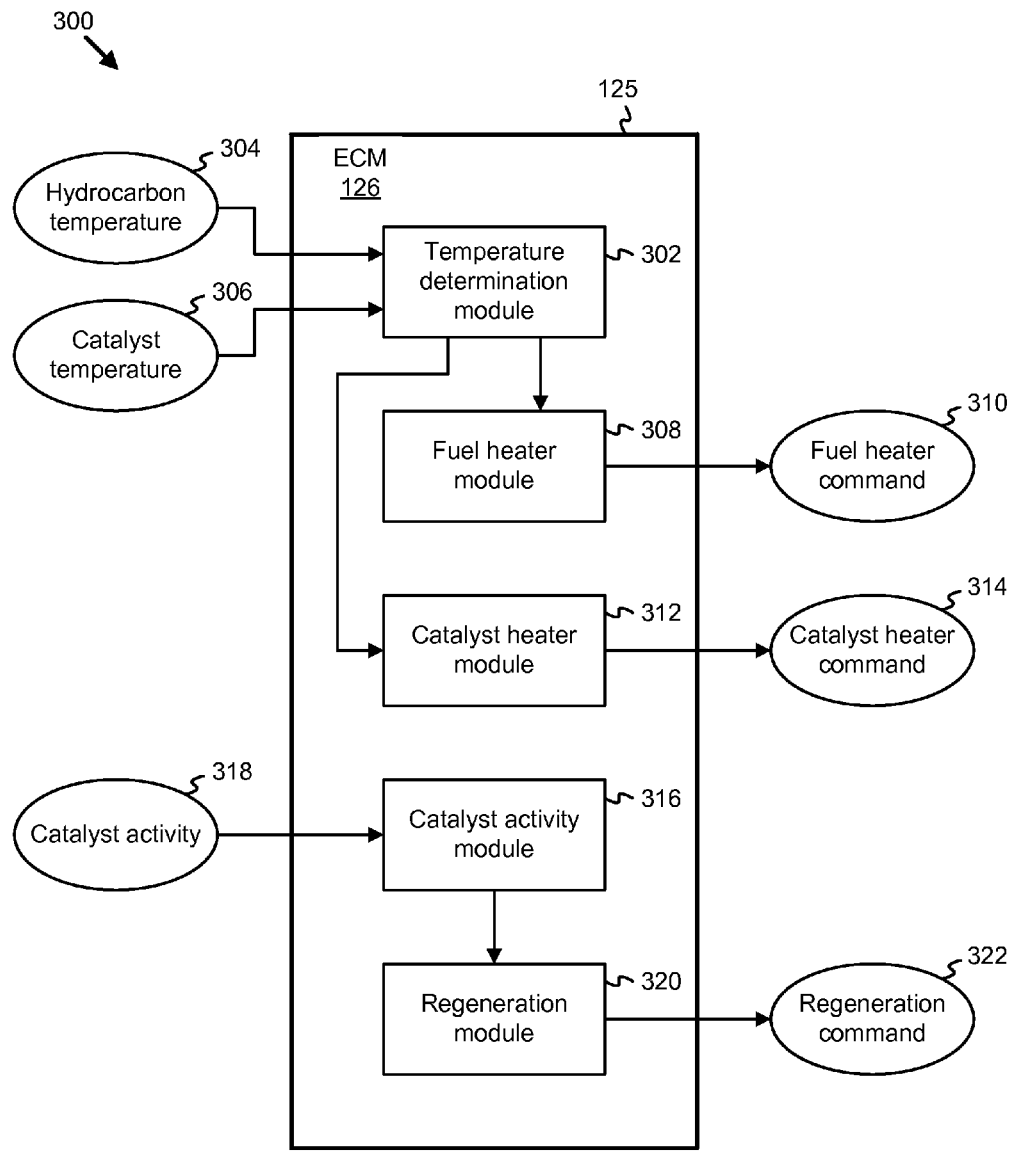
FIG. 3 is a schematic block diagram of an apparatus for on-board waste heat recovery.

In one embodiment, the system 100 includes a controller 125 in the form of an electronic control module (ECM) 126 in communication with various sensors and actuators in the system 100. The controller 125 may be, for example, an ECM 126 with memory and microprocessor capabilities, a microcontroller, an ASIC or another type of microprocessor(s) or integrated circuit(s) or portions or combinations thereof. FIG. 1 illustrates a temperature sensor on the hydrocarbon stream 108 and a temperature sensor on the catalyst element 110, but the system 100 may have other sensors and may not have the illustrated sensors. Any sensor in the system 100 may be a real sensor or a virtual sensor—i.e. a system parameter available on a computer readable medium that may be calculated from other measured or estimated values. The ECM 126 may have a plurality of modules configured to functionally execute steps in the on-board recovery of waste heat. The ECM 126 may have a temperature determination module, a fuel heater module, a catalyst heater module, a catalyst activity module, and/or a regeneration module. A given embodiment of the ECM 126 may include any or all of these modules, and any module may be implemented in hardware or software outside of the ECM 126. The description referencing FIG. 3 provides details for a an example embodiment of the ECM 126.

Figure 2:
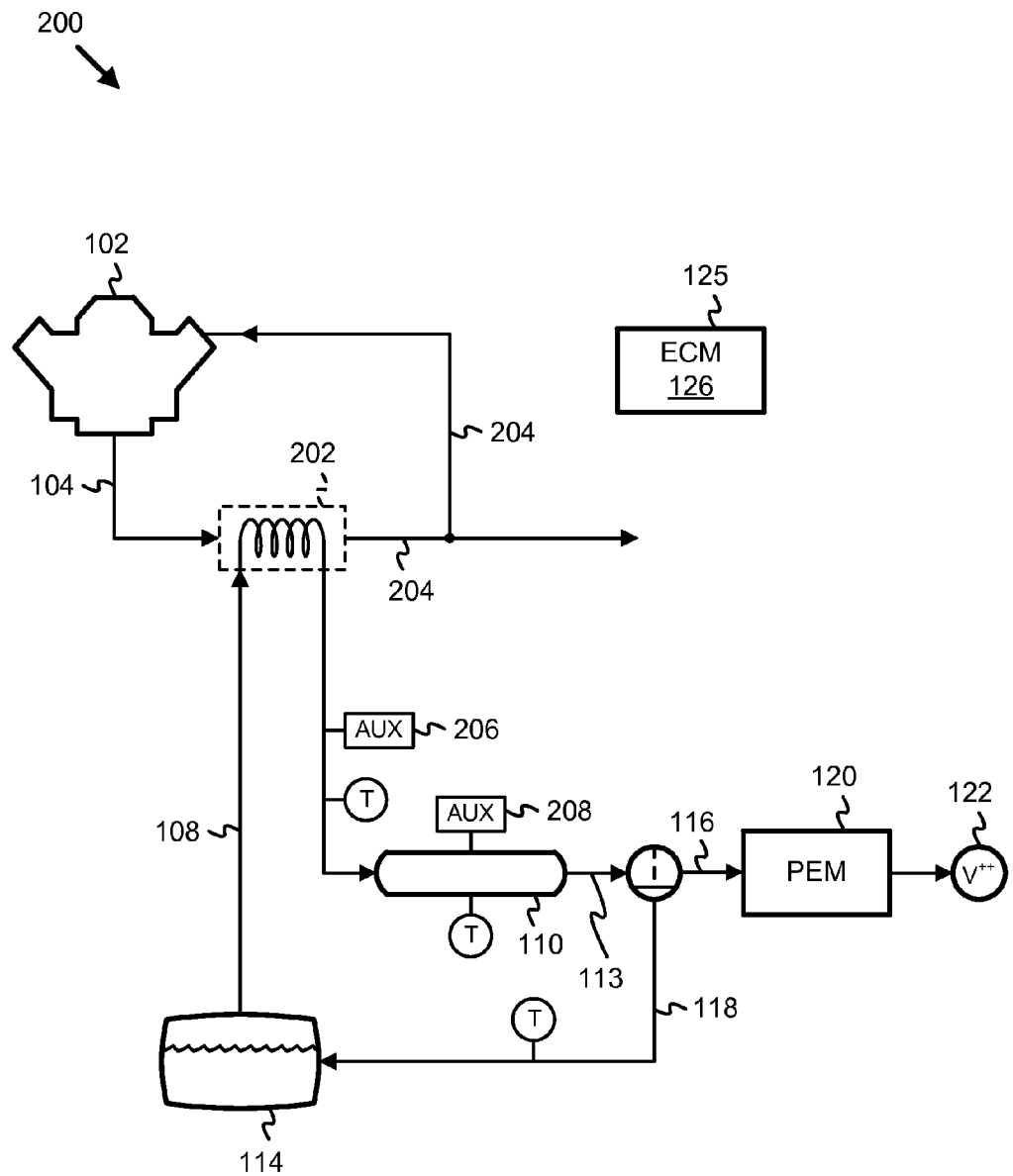
FIG. 2 is a schematic diagram of an alternate type of system for on-board waste heat recovery.

FIG. 2 is a schematic diagram of an alternate embodiment of a system 200 for on-board waste heat recovery. In the example of FIG. 2, the hydrocarbon stream 108 is heated by passing through a heating jacket on an EGR cooler 202, to remove heat from an EGR stream 204 and heating the hydrocarbon stream 108. The heated hydrocarbon stream 108 may be further heated by an auxiliary heater 206. The auxiliary heater 206 may be an electric heater, a burner, and/or any other type of heater configured to heat the hydrocarbon stream 108 before entry to the catalyst element 110. The auxiliary heater 206 may be commanded by the ECM 126. The ECM 126 may determine the hydrocarbon stream 108 temperature and provide a fuel heater command to the auxiliary heater 206 to heat the hydrocarbon stream 108 to a specified temperature. The ECM 126 may also ensure the hydrocarbon stream 108 is vaporized, for example by heating the hydrocarbon stream 108 to a specified temperature that is several degrees above the boiling point of the hydrocarbons. In one embodiment, the ECM 126 heats the hydrocarbon stream 108 to a specified temperature based on a desired reaction rate in the catalyst element 110, including a desired amount of hydrogen 116 to be evolved from the catalyst element 110. In a further embodiment, the auxiliary heater 206 may be configured to heat the hydrocarbon stream 108 when the engine 102 is at an operating point where the exhaust stream 104 is at a low temperature.

The system 200 further includes a catalyst element 110. In addition to the embodiment illustrated in FIG. 1, the system 200 includes a second auxiliary heater 208 configured to heat the catalyst element 110. The second auxiliary heater 208 may be commanded by the ECM 126. The ECM 126 may determine the catalyst element 110 temperature and provide a catalyst heater command to the second auxiliary heater 208 to heat the catalyst element 110 to a specified temperature. The specified temperature may be a minimum temperature at which a hydrogen removal reaction occurs, a temperature at which a desired rate of hydrogen removal is achieved, and/or a temperature at which the catalyst element 110 can regenerate and restore catalyst activity after deactivation.

Deactivation of the catalyst element 110 typically occurs due to coking of the catalyst element 110 by carbon over a period of time, and regeneration is preferably achieved through oxygenated regeneration at high temperatures (e.g. 500° C.). For example, the ECM 126 may determine that the catalyst activity has dropped below a threshold, and the ECM 126 may command the second auxiliary heater 208 to heat the catalyst element 110 to a high temperature. Additionally, the ECM 126 may command an oxygenated stream (not shown) to flow to the catalyst element 110 during a regeneration. The oxygenated stream may be a heated air stream, an exhaust stream (that is not depleted of oxygen), a stream taken from the engine 102 inlet after a compressor stage, or other oxygenated stream available in the system 200. The time required for a regeneration to complete depends upon the level of coking of the catalyst element 110, the amount of oxygen available in the oxygenated stream, and the temperature of the catalyst element 110 for the regeneration event. The selections for these values are within the skill of one in the art based on values that are typically known for a given system 200 and the disclosures herein.

The ECM 126 may determine that the catalyst activity in the catalyst element 110 has dropped below a threshold by any method known in the art. The ECM 126 may track the total amount of hydrocarbons from the hydrocarbon stream 108 that pass through the catalyst element 110, the total amount of time the hydrocarbon stream 108 flows, the hours of engine 102 operation, and/or the total miles traveled by a vehicle wherein the system 200 is installed. Further, correction factors may be applied for the actual temperatures experienced at the catalyst element 110, for an estimated hydrocarbon stream 108 composition, and/or for similar parameters understood to affect a rate of carbon deposition on the catalyst element 110. For example, a higher hydrocarbon stream 108 density may indicate a higher molecular weight fuel with a greater propensity to coking. A lower temperature in the hydrocarbon stream 108 and/or at the catalyst element 110 may indicate a liquid hydrocarbon at the catalyst element 110 that does break molecules to allow coking, a higher temperature may indicate regeneration or a low coking amount, and a middle temperature may indicate a greater coking amount. Further, during periods where hydrogen is provided to the catalyst element 110 inlet, the ECM 126 may estimate lower coking rates than during periods where hydrogen is not provided to the catalyst element 110 inlet.

FIG. 3 is a schematic block diagram of an apparatus 300 for on-board waste heat recovery. The apparatus 300 includes an ECM 126 having modules configured to functionally execute the steps of on-board waste heat recovery. The ECM 126 includes a temperature determination module 302 that interprets a hydrocarbon temperature 304 and a catalyst temperature 306. Interpreting a temperature includes reading a temperature value from a computer readable medium such as a memory of the type previously described, taking an electronic signal from a sensor and calculating a temperature from the signal, reading a value from a datalink and/or sensor, and calculating a temperature value from other parameters available in the ECM 126. The ECM 126 further includes a fuel heater module 308 that determines a fuel heater command 310 based on the hydrocarbon temperature 304. The fuel heater command 310 may be a command to the auxiliary heater 206 that brings the hydrocarbon stream 108 from the hydrocarbon temperature 304 to a specified temperature, in steady state and/or over a transient response period.

The ECM 126 further includes a catalyst heater module 312 that determines a catalyst temperature command 314. The catalyst heater command 314 may be a command to the second auxiliary heater 208 that brings the catalyst element 110 from the catalyst temperature 306 to a specified temperature, in steady state and/or over a transient response period. The ECM 126 may further include a catalyst activity module 316 that interprets a catalyst activity value 318, and a regeneration module 320 that determines a regeneration command 322 based on the catalyst activity value 318. The regeneration command 322 may be a specified temperature value for the catalyst, and/or an oxygenated stream command to allow oxygenated gas to flow through the catalyst element.

Figure 4:
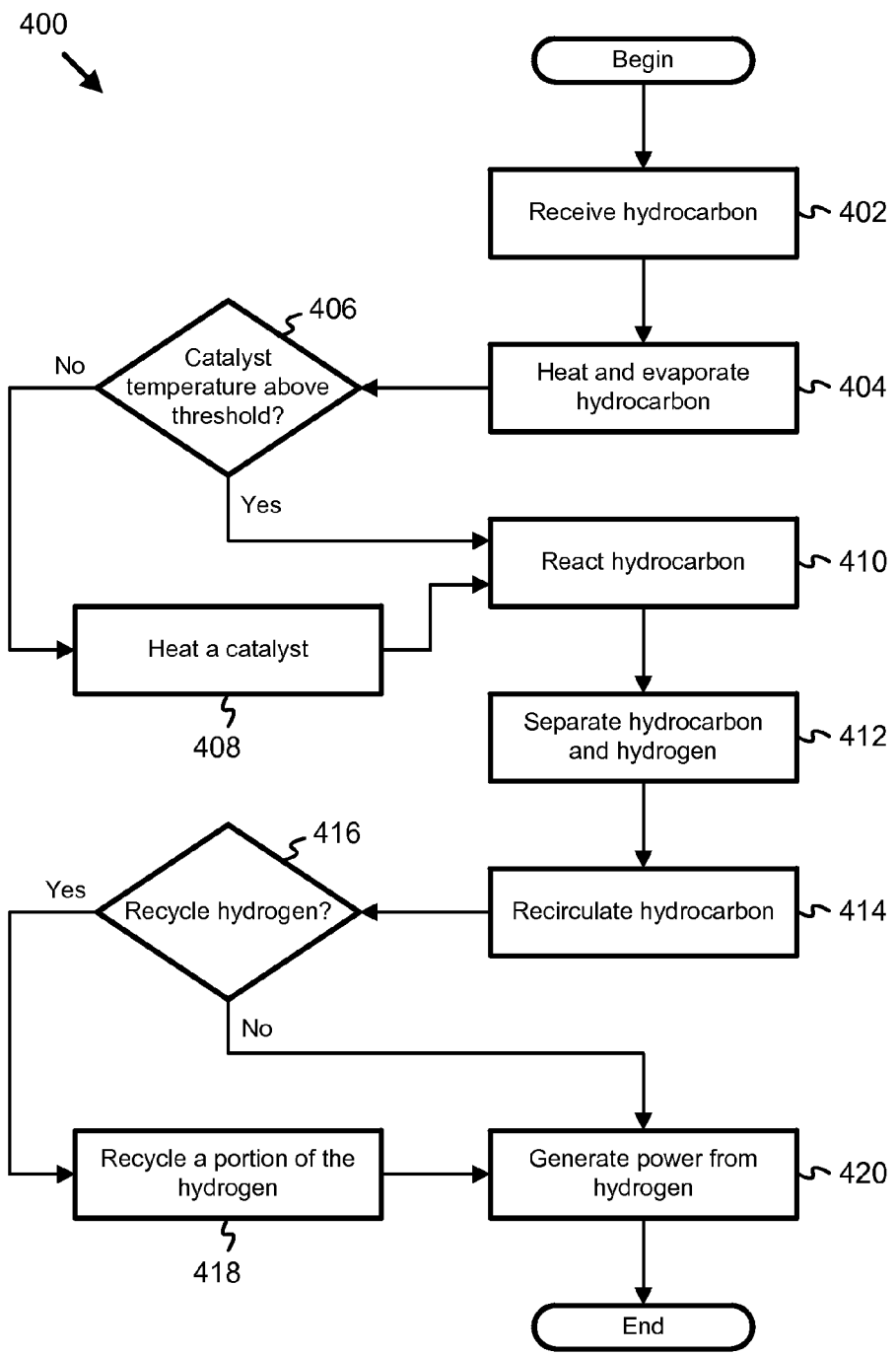
FIG. 4 is a schematic flow chart diagram illustrating a procedure to recover on-board waste heat.

FIG. 4 is a schematic flow chart diagram illustrating a procedure 400 to recover on-board waste heat. The procedure 400 includes a system 100 performing an operation 402 to receive a hydrocarbon stream 108, and a heat exchanger 202 performing an operation 404 to heat and evaporate the stream. The procedure 400 includes a temperature determination module 302 performing an operation 406 to determine whether a catalyst temperature 306 is above a threshold, and a second auxiliary heater 208 performing an operation 408 to heat the catalyst element 110 in response to the catalyst temperature 306 being lower than (or equal to) the threshold. The procedure 400 includes the catalyst element 110 performing an operation 410 to react the hydrocarbon stream 108, and a separator performing an operation 412 to separate the hydrocarbon and at least a fraction of the hydrogen into a modified hydrocarbon stream 118 and a hydrogen stream 116.

In one embodiment, the procedure 400 includes an operation 414 to recirculate the modified hydrocarbon stream 118 into a fuel source 114. The procedure 400 further includes an operation 416 to determine whether hydrogen should be recycled. The procedure 400 includes an operation 418 to recycle a portion of the hydrogen stream 116 when recycle is active, and an operation 420 to generate power from the remaining hydrogen.

Figure 5:
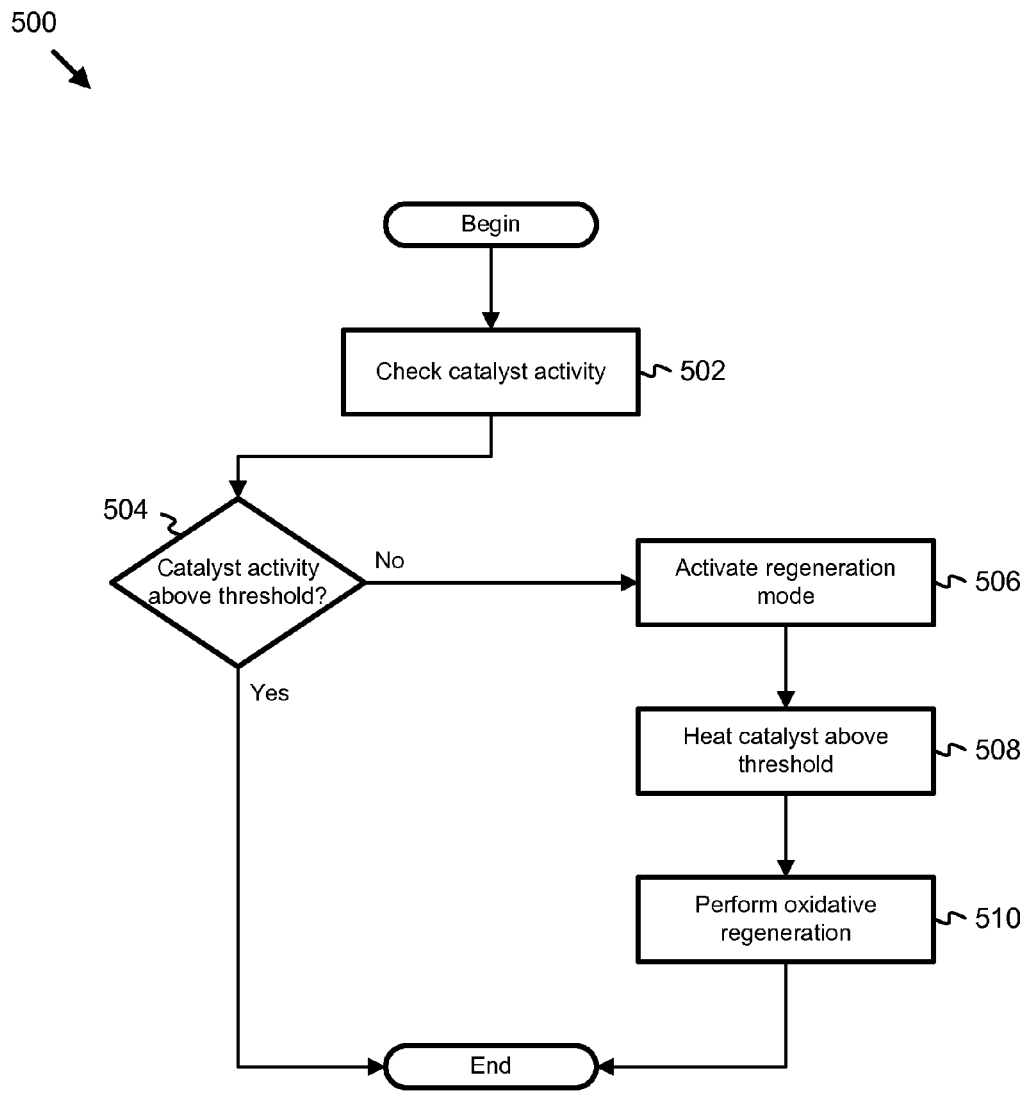
FIG. 5 is a schematic flow chart diagram illustrating a catalyst element regeneration procedure.

FIG. 5 is a schematic flow chart diagram illustrating a catalyst regeneration procedure 500. The procedure 500 may be performed independently of a procedure for on-board waste heat recovery (see, e.g. description referencing FIG. 4), and may be performed periodically at intervals expected to be more frequent than an expected catalyst activity degradation interval for the catalyst element 110. The procedure 500 includes a catalyst activity module 316 performing an operation 502 to interpret (e.g. check) a catalyst activity value 318. The procedure 500 includes a regeneration module 320 performing an operation 504 to check whether the catalyst activity value 318 is greater than a threshold. Where the catalyst activity value 318 is not greater than a threshold, the regeneration module 320 performs an operation 506 to activate a regeneration mode, and a catalyst heater module 312 performs an operation to heat 508 a catalyst element 110 above a threshold (or specified temperature) by providing a catalyst heater command 314. The procedure 500 includes an operation 510 to perform an oxidative regeneration, for example by the ECM 126 commanding an oxygenated stream to flow through the catalyst element 110 when the catalyst element 110 is above the threshold temperature for regeneration. When the catalyst activity value 318 is determined to be above the threshold, the procedure 500 concludes without performing a regeneration.

Any experimental (including simulation) results are exemplary only and are not intended to restrict any inventive aspects of the present application. Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any claims that follow are desired to be protected.

One exemplary embodiment is a method including receiving a hydrocarbon stream, transferring heat from an exhaust stream to the hydrocarbon stream, catalyzing the hydrocarbon stream to a lower saturation state thereby producing a products stream, separating the products stream into a hydrogen stream and a modified hydrocarbon stream, and recovering an amount of energy from the hydrogen stream.

In certain embodiments, the method includes recycling at least a portion of the hydrogen stream to a catalyst inlet, returning the modified hydrocarbon stream to a fuel supply, evaporating the hydrocarbon stream before the catalyzing, and/or determining whether an activity of a catalyst has fallen below a threshold and regenerating the catalyst in response to the activity of the catalyst falling below the threshold. In further embodiments, the method includes flowing an oxygenated stream to the catalyst during the regenerating the catalyst.

The operation to recover an amount of energy from the hydrogen stream includes, in some embodiments, burning the hydrogen stream, reacting the hydrogen stream in a fuel cell, and/or storing the hydrogen stream. The method includes, in some embodiments, commanding a first auxiliary heater to heat the hydrocarbon stream, and/or providing a catalyst to perform the catalyzing and commanding a second auxiliary heater to heat the catalyst.

Another exemplary embodiment is a system including an internal combustion engine operationally coupled to a fuel supply and producing an exhaust stream, a heat exchanger that transfers heat from the exhaust stream to a hydrocarbon stream, a catalyst that receives the hydrocarbon stream and creates a products stream including hydrogen and modified hydrocarbons. The modified hydrocarbons include hydrocarbons having a lower saturation state than the hydrocarbon stream. The system further includes a separator that divides the products stream into a hydrogen stream comprising primarily the hydrogen and a modified hydrocarbon stream comprising primarily the modified hydrocarbons, and a means for recovering energy from the hydrogen.

The catalyst includes γ-alumina supported Pt, zeolite supported Pt, Pt—Sn/γ-alumina-$ZrO_2$/$SO_4^{2-}$ hybrid, Pt-zeolite/γ-alumina-$ZrO_2$/$SO_4^{2-}$ hybrid, Pt—ZrO2/WO3, Pt/heteropolyacid/$SiO_2$, Ni/$SiO_2$—$Al_2O_3$, and/or other known catalyst formulations. In a further embodiment, the catalyst includes a Pt—Sn/γ-alumina-$ZrO_2$/$SO_4^{2-}$ hybrid calcined in air for about 12 hours at 550° C. The system may include one or more of a first auxiliary heater that heats the hydrocarbon stream and a second auxiliary heater that heats the catalyst.

In a further embodiment, the system includes a controller having modules to functionally execute procedures to heat various streams and/or regenerate the catalyst. The controller includes a temperature determination module, a fuel heater module, a catalyst heater module, a catalyst activity module, and/or a regeneration module. The temperature determination module determines a hydrocarbon temperature of the hydrocarbon stream and/or a catalyst temperature. The fuel heater module provides a fuel heater command in response to the hydrocarbon temperature being lower than a threshold. The catalyst heater module provides a catalyst heater command in response to the catalyst temperature being lower than a threshold. The catalyst activity module determines a catalyst activity, and the regeneration module provides a regeneration command in response to the catalyst activity being lower than a threshold.

Yet another exemplary embodiment is a method including receiving a hydrocarbon stream, heating and evaporating the hydrocarbon stream, reacting the hydrocarbon stream in the presence of a catalyst to provide a products stream having hydrogen and modified hydrocarbon products comprising a lower saturation state than the hydrocarbon stream, separating the products stream into a modified hydrocarbon stream and a hydrogen stream, and recovering energy from the hydrogen stream. In certain embodiments, the heating and evaporating the hydrocarbon stream includes exchanging heat from an exhaust stream of an internal combustion engine to the hydrocarbon stream, and/or the hydrocarbon stream includes fuel from a fuel supply for an internal combustion engine.

In a further embodiment the method includes determining whether a catalyst temperature is above a threshold and heating the catalyst in response to the catalyst temperature being below the threshold. In certain embodiments, the method includes recirculating the modified hydrocarbon stream to a fuel supply, generating power from the hydrogen stream, and/or recycling a portion of the hydrogen stream to an inlet of the catalyst. The recovering energy includes generating power in a fuel cell, generating heat in a burner, recovering chemical energy of the hydrogen as kinetic energy, storing the hydrogen as chemical potential energy, and/or other energy recovery methods.

One nonlimiting description of an invention is directed to a system, comprising: a catalyst receiving a hydrocarbon amount, the catalyst producing hydrogen and a modified hydrocarbon product. The modified hydrocarbon product is at a lower saturation state than the hydrocarbon amount. Further aspects of the system optionally include a conduit that conducts the modified hydrocarbon product to a fuel tank that supplies fuel to an engine. The system may further include an energy recovery unit that produces energy from the hydrogen. The energy recovery unit may be a fuel cell that generates electricity. In other embodiments, the energy recovery unit may be a burner that generates heat, pressure, steam, or other energy sources accessible for performing work in the system. Further aspects of the system optionally include a heater to vaporize the hydrocarbon amount and/or to heat the hydrocarbon amount to a target temperature, a second conduit that recycles at least a portion of the hydrogen to an inlet of the catalyst, and a regeneration module that preserves and/or restores an activity level of the catalyst. The regeneration module may periodically regenerate the catalyst, regenerate the catalyst based on an estimated catalyst activity level, or modulate a hydrogen recycle rate to preserve the catalyst activity. Further aspects of the system optionally include one or more heat exchangers that vaporize the hydrocarbon amount, heat the hydrocarbon amount, and/or heat the catalyst. The heat exchangers may be configured to utilize an exhaust stream from an engine on a hot side. The heat exchangers may further be configured with an alternate heat source that may be utilized during some periods of engine operation.

Still a further nonlimiting description of an invention of the present application is directed to a procedure, comprising receiving a hydrocarbon amount, reacting the hydrocarbon amount on a catalyst to produce hydrogen and a modified hydrocarbon product, recycling the modified hydrocarbon product to a fuel tank, and producing energy from the hydrogen. In other embodiments, the procedure further includes heating the hydrocarbon amount to a target temperature, and vaporizing the hydrocarbons. Further aspects of the procedure optionally include recycling at least a portion of the hydrogen to an inlet of the catalyst, and preserving or restoring an activity level of the catalyst. The procedure may include heating the hydrocarbon amount utilizing heat from exhaust gases of an engine or utilizing heat from an auxiliary heater.

Yet another nonlimiting description of an invention is directed to an apparatus, comprising: a temperature determination module configured to interpret a hydrocarbon temperature and a catalyst temperature, a fuel heater module configured to determine a fuel heater command based on the hydrocarbon temperature, and a catalyst heater module configured to determine a catalyst temperature command based on the catalyst temperature. In one refinement of this invention, the apparatus further includes a catalyst activity module configured to interpret a catalyst activity value, and a regeneration module configured to determine a regeneration command based on the catalyst activity value.

What is claimed is:

1. A system, comprising:
   an internal combustion engine operationally coupled to a fuel supply and producing an exhaust stream;
   a heat exchanger structured to transfer heat from the exhaust stream to a hydrocarbon stream;
   a catalyst receiving the hydrocarbon stream and structured to react the hydrocarbon stream to produce hydrogen and modified hydrocarbons, the modified hydrocarbons comprising hydrocarbons having a lower saturation state than the hydrocarbon stream, wherein the catalyst comprises a Pt—Sn/γ-alumina-$ZrO_2$/$SO_4^{2-}$ hybrid calcined in air for about 12 hours at 550° C.;
   a separator that divides the hydrogen and modified hydrocarbons into a hydrogen stream comprising primarily the hydrogen and a modified hydrocarbon stream comprising primarily the modified hydrocarbons; and
   a means for recovering energy from the hydrogen.

2. The system of claim 1, further comprising a first auxiliary heater structured to heat the hydrocarbon stream.

3. The system of claim 1, further comprising a second auxiliary heater structured to heat the catalyst.

4. The system of claim 1, further comprising a controller comprising:
   a temperature determination module structured to determine a hydrocarbon temperature and a fuel heater module structured to provide a fuel heater command in response to the hydrocarbon temperature being lower than a threshold.

5. The system of claim 1, further comprising a controller comprising:
   a temperature determination module structured to determine a catalyst temperature; and
   a catalyst heater module structured to provide a catalyst heater command in response to the catalyst temperature being lower than a threshold.

6. The system of claim 1, further comprising a controller comprising:
   a catalyst activity module structured to determine a catalyst activity; and
   a regeneration module structured to provide a regeneration command in response to the catalyst activity being lower than a threshold.

7. A system, comprising:
   an internal combustion engine operationally coupled to a fuel supply and producing an exhaust stream;
   a heat exchanger structured to transfer heat from the exhaust stream to a hydrocarbon stream;
   a catalyst receiving the hydrocarbon stream and structured to react the hydrocarbon stream to produce hydrogen and modified hydrocarbons, the modified hydrocarbons comprising hydrocarbons having a lower saturation state than the hydrocarbon stream;
   a separator that divides the hydrogen and modified hydrocarbons into a hydrogen stream comprising primarily the hydrogen and a modified hydrocarbon stream comprising primarily the modified hydrocarbons; and
   a means for recovering energy from the hydrogen;
   a controller comprising a catalyst activity module, a regeneration module, and a recycling module, wherein the catalyst activity module is structured to determine a catalyst activity, wherein the regeneration module is structured to provide a regeneration command in response to the catalyst activity being lower than a threshold, and wherein the recycling module is structured to recycle a fraction of the hydrogen stream to a catalyst inlet in response to the catalyst activity, composition of the hydrocarbons, catalyst composition and operating temperature.

8. The system of claim 7, wherein the recycling module is further structured to provide an oxygenated stream to the catalyst.

9. A system, comprising:
an internal combustion engine operationally coupled to a fuel supply and producing an exhaust stream;
a heat exchanger structured to transfer heat from the exhaust stream to a hydrocarbon stream;
a catalyst receiving the hydrocarbon stream and structured to react the hydrocarbon stream to produce hydrogen and modified hydrocarbons, the modified hydrocarbons comprising hydrocarbons having a lower saturation state than the hydrocarbon stream;
a separator that divides the hydrogen and modified hydrocarbons into a hydrogen stream comprising primarily the hydrogen and a modified hydrocarbon stream comprising primarily the modified hydrocarbons;
a controller including a recycling module structured to recycle a fraction of the hydrogen stream to a catalyst inlet in response to a catalyst activity value, a composition of the hydrocarbons, a catalyst composition and an operating temperature; and
a means for recovering energy from the hydrogen.

10. The system of claim 9, wherein the controller further comprises:
a temperature determination module structured to determine a hydrocarbon temperature; and
a fuel heater module structured to provide a fuel heater command in response to the hydrocarbon temperature being lower than a first threshold.

11. The system of claim 10, further comprising a first auxiliary heater structured to heat the hydrocarbon stream in response to the fuel heater command.

12. The system of claim 11, wherein the controller further comprises:
the temperature determination module further structured to determine a catalyst temperature; and
a catalyst heater module structured to provide a catalyst heater command in response to the catalyst temperature being lower than a second threshold.

13. The system of claim 12, further comprising a second auxiliary heater structured to heat the catalyst in response to the catalyst heater command.

14. The system of claim 13, wherein the catalyst comprises a Pt—Sn/γ-alumina-$ZrO_2$/$SO_4^{2-}$ hybrid calcined in air for about 12 hours at 550° C.

15. The system of claim 14, further comprising a return path that returns the modified hydrocarbon stream to a fuel supply.

16. A system, comprising:
an internal combustion engine operationally coupled to a fuel supply and producing an exhaust stream;
a means for exchanging heat from the exhaust stream to a hydrocarbon stream;
a means for evaporating the hydrocarbon stream;
a means for reacting the hydrocarbon stream with a catalyst to produce hydrogen and modified hydrocarbons having a lower saturation state than the hydrocarbon stream;
a means for separating the hydrogen and the modified hydrocarbons into a hydrogen stream and a modified hydrocarbon stream;
a means for recycling a fraction of the hydrogen stream to a catalyst inlet in response to a catalyst activity value, a composition of the hydrocarbons, a catalyst composition, and an operating temperature to slow degradation of the catalyst; and
a means for recovering energy from a remaining fraction of the hydrogen.

17. The system of claim 16, wherein the means for recovering energy comprises at least one recovery process selected from a group of processes consisting of a combustion of the hydrogen, a reaction of the hydrogen in a fuel cell, and a storage of the hydrogen.

18. The system of claim 16, wherein the catalyst comprises a formulation selected from a group of formulations consisting of: γ-alumina supported Pt, zeolite supported Pt, Pt—Sn/γ-alumina-$ZrO_2$/$SO_4^{2-}$ hybrid, Pt-zeolite/γ-alumina-$ZrO_2$/$SO_4^{2-}$ hybrid, Pt—ZrO2/WO3, Pt/heteropolyacid/$SiO_2$, and Ni/$SiO_2$—$Al_2O_3$.

* * * * *